United States Patent [19]

Petrosky

[11] 3,900,983

[45] Aug. 26, 1975

[54] RAT REMOVING

[76] Inventor: Charles Petrosky, 1118 N. Jefferson St., Arlington, Va. 22205

[22] Filed: Apr. 19, 1974

[21] Appl. No.: 462,501

[52] U.S. Cl. .................................... 43/58; 43/60
[51] Int. Cl. ............................................ A01m 23/08
[58] Field of Search .............. 43/58, 60, 132 A, 125

[56] References Cited
UNITED STATES PATENTS

| | | | |
|---|---|---|---|
| 1,071,876 | 9/1913 | Campau | 43/132 A |
| 1,139,587 | 5/1915 | Seeley et al. | 43/58 |
| 1,716,196 | 6/1929 | Swanson | 43/58 X |
| 2,467,922 | 4/1949 | Woytal et al. | 43/125 X |

*Primary Examiner*—Louis G. Mancene
*Assistant Examiner*—Peter K. Skiff
*Attorney, Agent, or Firm*—James C. Wray

[57] ABSTRACT

A person having a back-mounted portable sprayer sprays a trail of rat-enticing substance along alleyways and up ramps. Ramps are connected to upper portions of large containers which are configured for mounting on haulage-type road vehicles. Trailers, tilt-bed type containers and truck-mounted containers are used. After a container has a load of rats, access doors are closed, ramps are folded on top of the containers, vents are closed, and an inlet is connected to a vehicle exhaust. Rats are killed while the vehicle draws to its destination flowing lethal exhaust gases through the container and out through a vent at a remote end of the container. At a destination rat carcasses are emptied and destroyed.

10 Claims, 3 Drawing Figures

RAT REMOVING

BACKGROUND OF THE INVENTION

Rats are, and for a long time have been, a major problem in metropolitan areas. One of the main problems of rats is their common domestication and lack of extreme fear of humans and preference of foods used by humans. While rats are a great problem in rural areas, the existence of many rats with many humans in metropolitan areas greatly magnifies their dangers and destructiveness.

It has been estimated that in the United States alone rats cause between one-half and one billion dollars annually in terms of direct economic losses. Most of these losses are occasioned by the contimation of foodstuffs while the rats are feeding and the physical damage to other materials because of the rat propensity to gnaw.

Rats are a hazard to the life, physical and mental health and welfare of human beings.

Rat bites are quite common. In a city such as Washington, D.C., for example, several thousand rat bites may be encountered each year. Great damage or death may be caused to infants or invalids. Several diseases are associated with rats, the most common of which are rat-bite fever, leptospirosis, salmonellosis from foods contaminated with rat droppings, trichinosis spread to people from hogs which eat garbage containing droppings of infected rats, and rat parasite spread diseases such as murine typhus fever, plague and rickettsialpox. Other diseases which have been traced directly to rats are toxoplasmosis, listeriosis, and lymphocytic choriomeningitis.

Ridding areas of rodents has always been a recognized problem to which time and energy have been devoted.

All successful methods require the diligent cleaning of areas and maintaining areas in cleanly condition with foodstuffs and garbage stored appropriately to prevent infiltration by rats. Even an area which has been substantially cleared of rats may become reinfected in a short time if the basic precautions of cleanliness and proper storage facilities are not maintained.

One of the most effective ways of ridding an area of rats is by the use of poisons. Many poisons have been developed which have fair rat-killing power, but are dangerous to other animals and humans, and create problems of availability of antidotes for use in case of accidents.

All poisons are inherently dangerous and must be prepared, mixed, distributed and used carefully.

Poisons are not only dangerous when swallowed, but also the dust and fumes of many poisons may be extremely dangerous when inhaled or when contacting broken skin of handlers. Many poisons create a great danger of secondary poisoning, that is, animals may feed on the carcasses of poisoned animals and thus become poisoned themselves, and humans may also become poisoned by eating the meat of poisoned animals.

In addition to the inherent dangers involved in the use of ordinary poisons for rat extermination, the exorbitant costs of time and money make their use prohibitive. For example, when the common poisoning methods are employed, extreme precautions must be taken to insure against access to the poison by children and dogs and cats by giving public notice and keeping records of poisoned locations.

Another way of ridding an area of rats is by trapping. While trapping is successful in small installations, the use of existing traps is usually not successful for large scale applications.

Another method of controlling rats lies in the use of sound or ultrasonic radiation to keep rats out of protected premises. While that method denies certain areas to rats, it may not be effective in destroying large rat populations.

A discussion of control of domestic rats is found in the U.S. Department of Health, Education and Welfare Public Health Service Pamphlets available from the Consumer Protection and Environmental Health Service, Environmental Control Administration, Rockville, Maryland 20852. An example of such a publication is PHS Publication 563 (1956, 1969) entitled Control of Domestic Rats and Mice.

A collection of descriptions of systems and apparatus for controlling rodents and vermin is found in the U.S. Patent Office Classification of Technology at Class 43, and particularly in subclasses 58 through 73. There are found U.S. patents officially classified within that class and cross-referenced into that class, unofficial references collected by the examiner, and foreign patents and publications collected by the examiner. Examples of disclosures found in that class are: 329,960; 710,020; 938,397; 1,020,690; 1,1028,96; 1,108,724; 1,115,681; 1,139,587; 1,161,558; 1,163,071; 1,168,252; 1,314,200; 1,446,609; 1,538,308; 2,056,882; 2,255,955; 2,387,328; 2,962,836; 3,528,190.

Many problems remain in known existing systems and devices for the control of rats. Some of the problems are the inherent dangers of known chemicals used in poisoning techniques, the difficulties of trapping and killing rats in small numbers, and the lack of large scale apparatus for the systematic collection and destruction of rats without dangers of poisons and inefficiency of micro operations.

SUMMARY OF THE INVENTION

The present invention employs baiting techniques and trapping techniques in large traps and killing techniques for mass execution of rats, all without danger to the environment, animals or people and without possibilities of secondary poisoning or other residual effects.

Broad objectives of the present invention are accomplished by providing a large container configured for mounting on a large haulage-type roadway vehicle. The container has a bottom wall and side walls which rise upward from the bottom wall and has an upper portion with a top wall which covers the container. The bottom wall is provided with a support means which is capable of supporting the container on a roadway-type vehicle. The support means may be beams which rigidify the bottom so that the bottom may be lifted and placed on a vehicle. The support means in one embodiment are beams which are connected directly to a chassis of a truck. In another embodiment the support means are beams of a trailer which is integrally formed with the container for coupling to a tractor vehicle or to another truck. In still another preferred form of the invention, the support means are beams formed as skids and as a central beam with hooked shaped lower surfaces for engaging a bail on a tilt-bed truck. The support beams enable the large container to be left in a parked condition either on a street or more preferably in an alleyway or driveway, either by itself or on a truck or trailer bed. Preferably, one of the side walls is provided with a dump gate, and the tractor or trailer on which the container rests is provided with a tilting bed so that carcasses of trapped and killed rats may be dumped when the truck reaches its destination. In a preferred embodiment, the side wall which is the rear wall of the container as the container is mounted on a truck is provided with such a lifting gate. The gate is sealed such as by compressible material positioned around the opening so that a substantially airtight seal exists when the gate is closed. Alternatively, a dump gate may be provided in the bottom of the box or in lateral walls. Preferably, the dump gate has a hydraulic drive which is coupled to a hydraulic system of the truck for lifting the gate. Alternatively, the gate may be manually or hydraulically unlatched for tilting away from the rear side by the force of gravity as the container is tilted for dumping.

The upper portion of the container has plural openings which are small in size and which are provided with covers hinged to the openings. Individual covers may be provided; preferably the covers are interconnected so a single lever closes all covers or closes all covers on one side. Individual covers may be replaced with an elongated plate which is pivoted downward to close the openings or which is apertured at the openings and which is slid longitudinally to close the openings. The openings lead directly to the inside of the container. Preferably a small ledge is provided adjacent each opening. The ledge may be cantilevered from the opening, may be supported with a spring device which permits the ledge to tip downward rapidly to spill a small animal on the ledge when the animal advances to a point near the end of the ledge. Such ledges may project into the box. preferably the ledges project along a side of the box and are constructed narrowly so that a small animal cannot turn around on the ledge.

Each opening is provided, in a preferred embodiment of the invention, with an individual ramp which extends to the ground below the container. The ramps may be flat. Preferably, the ramps are formed with at least one side wall. In one embodiment, the ramps may be provided with two side walls, or the ramps may be enclosed except at ends as tunnels.

In one embodiment of the invention, upper ends of the ramps have downward projections which fit into pockets beneath the openings. When the container is moved, the ramps are lifted from those pockets and are placed in racks on the side of the containers. In a preferred form of the invention, the ramps are hinged beneath the openings and are hinged along the length so that the ramps may be folded up over the container. The handling of ramps does not cause a problem of rejection by rats, since rats are used to the odors of humans and are not repelled from materials which have been handled by humans.

Accesses are provided in the upper portion and in the side walls of the container for inspecting the contents of the container and for ventilating the container and for inserting bait in the container.

In a preferred embodiment of the invention, the entire upper portion is removable from the container for gaining access to the entire inside of the container. Windows are provided in the container, preferably in the side, for visual inspection of the container contents, to judge a quantity of rats which have been collected in the container. In one form of the invention, the viewing windows are hinged over screens which may also be hinged for access to the container. The windows are folded back against the outer surface of the container when it is desired to open and vent the entire container. In a preferred form of the invention, a special door is provided for bait access to the container. An inside of the door is provided with a hook for mounting bait. Preferably the bait access door is mounted on the top wall of the container in a central position so that the hook suspends bait in the container at a distance from the entrance opening so that rats jump toward the bait and fall into the container.

In a preferred embodiment of the invention, killing of the rats is accomplished by filling the container with lethal exhaust fumes from an engine. In one embodiment of the invention, a three-way valve is connected to an exhaust pipe of a vehicle so that exhaust may pass directly out of the exhaust pipe through the valve or may be diverted to a hose connection and to a hose which is in turn connected to the container for filling the container with fumes.

The container may be filled with fumes for a predetermined time period and then sealed off to retain the fumes within the container. Such procedure is useful when a container is filled with exhaust fumes before loading it on a truck. An input port in the container in that case is provided with a sealable entrance which may be closed by a valve or door. In another embodiment of the invention, a vent is provided at a point in the container distantly removed from the fume inlet port. The vent has a slight opening so that fumes continually flow outward through the vent, thus ensuring the continued washing of the container with fresh exhaust fumes. That mode is employed when exhaust fumes are supplied continuously to the container, such as during the traveling of a vehicle. In a later case, container vents and exhaust fume entrance connections are preferably mounted in side walls of the container near the bottom of the container and are configured so that several containers may be pushed together, connecting the exhaust vent of one container to an input of another container so that several containers may be aligned and coupled on a truck bed. In one form of the invention, a flexible hose is permanently attached to a container inlet port so that the flexible hose may be attached to a truck exhaust during the carrying of a loaded container.

Preferably inlet ports and vents are provided with screened enclosures on the inside of the truck body to ensure against blocking of the ports with carcasses of dead animals or other obstructions.

The primary lethal gas in exhaust fumes is carbon monoxide. Carbon monoxide has a molecular weight of 28. Air, which is chiefly composed of nitrogen and oxygen, has a combined molecular weight of about 29. Carbon monoxide mixes well with air and the mixture is enhanced by the continued storing of the gases such as by continued throughput of exhaust fumes.

In a preferred embodiment of the invention, the rat-mobile consists of two major components: vehicle-driven rat bin and portable tanks to be worn by employees. The rat bin is a hydraulic dump container mounted on back of a truck separate and distinct from cap portion. The rat bin is a tank-like container, about the size of an average trash truck bin, with circular openings at various intervals near the top. On the outside of the bin are small ramps leading to the circular entrances, which are released to the ground when vehicle is immobile. Inside, the bin is plastic or metal lined, and the central top portion is designed to hold rat bait — fried chicken or any other food alluring to the rat. A narrow platform lines the inside of the bin directly under the circular entrances. At the bottom of the bin are check valves to release carbon monoxide for rodent destruction. By means of a hose coupling, carbon monoxide is released from the exhuast pipe of a vehicle to the check valves in the bottom of the rat bin. The closing of the circular entrances, the release of the ramps and the release of the carbon monoxide are controlled by the driver.

The portable tanks are similar to oxygen tanks worn by divers. In lieu of oxygen, chicken grease or comparable bait is used in the tanks.

One object of the invention is the provision of a rat baiting and killing system which employs large containers with ramps leading to holes near the tops of the containers and with bait inside the containers for trapping large volumes of rats.

The invention has as another object the provision of a rat baiting and trapping system which employs a large container with ramps and upper openings and which employs portable sprayers for spraying trails through the surrounding environs to the ramps and up the ramps to the baited container.

Another object of the invention is the provision of a system for destroying rats which includes large, substantially airtight trap containers and means for coupling the containers to exhausts of vehicles.

One object of the invention is the provision of rat trapping apparatus comprising a large container configured for mounting on a large haulage-type road vehicle, the container having side walls, a bottom wall connected to the side walls and having an upper portion with a top wall joined to the side walls in completion of the container, the support means connected to the bottom wall for supporting the container on a support vehicle, emptying means connected to the container for emptying contents of the container, plural openings in the upper portion for providing ingress into the container, doors connected to the upper portion adjacent the plural openings for selectively closing the plural openings and ramp means connected to the upper portion adjacent the openings and extending downward and outward to ground level whereby rodents climb the ramp means and enter the container through the openings, and whereby the container may be hauled away and emptied by a roadway vehicle when rodents have been collected in the container.

Another object of the invention is the provision of rat trapping and killing apparatus wherein the trapping means comprises a large walled container and wherein the killing means comprises a hose coupling connected to a wall, a screened enclosure connected to the wall inside the coupling, and a vehicular exhaust pipe coupling means connected to the hose coupling for communicating the hose coupling with a vehicular exhaust pipe whereby lethal gases from a vehicular exhaust pipe passed through the hose coupling and screened enclosure into the container.

Another object of the invention is the provision of the foregoing apparatus wherein the coupling means comprises a three-way valve for connection to the exhaust pipe for alternatively supplying air to the hose coupling and container and to a direct exhaust.

Other objects of the invention are the provision of vermin-enticing trail means extending from a trap along ramp means and outward from bases of a ramp means on surrounding horizontal surfaces for attracting and leading rodents to the container, and wherein the trail means comprises particles sprayed on the ramp and on the ground via a spray stream and wherein the apparatus also comprises a hand sprayer and body mounted back-pack type spray apparatus for directing the trail means around the container.

These and further and other objects and features of the invention are apparent in the disclosure which includes the foregoing and ongoing specification and claims and the drawings.

DETAILED DESCRIPTION OF THE DRAWINGS

Figure 1:
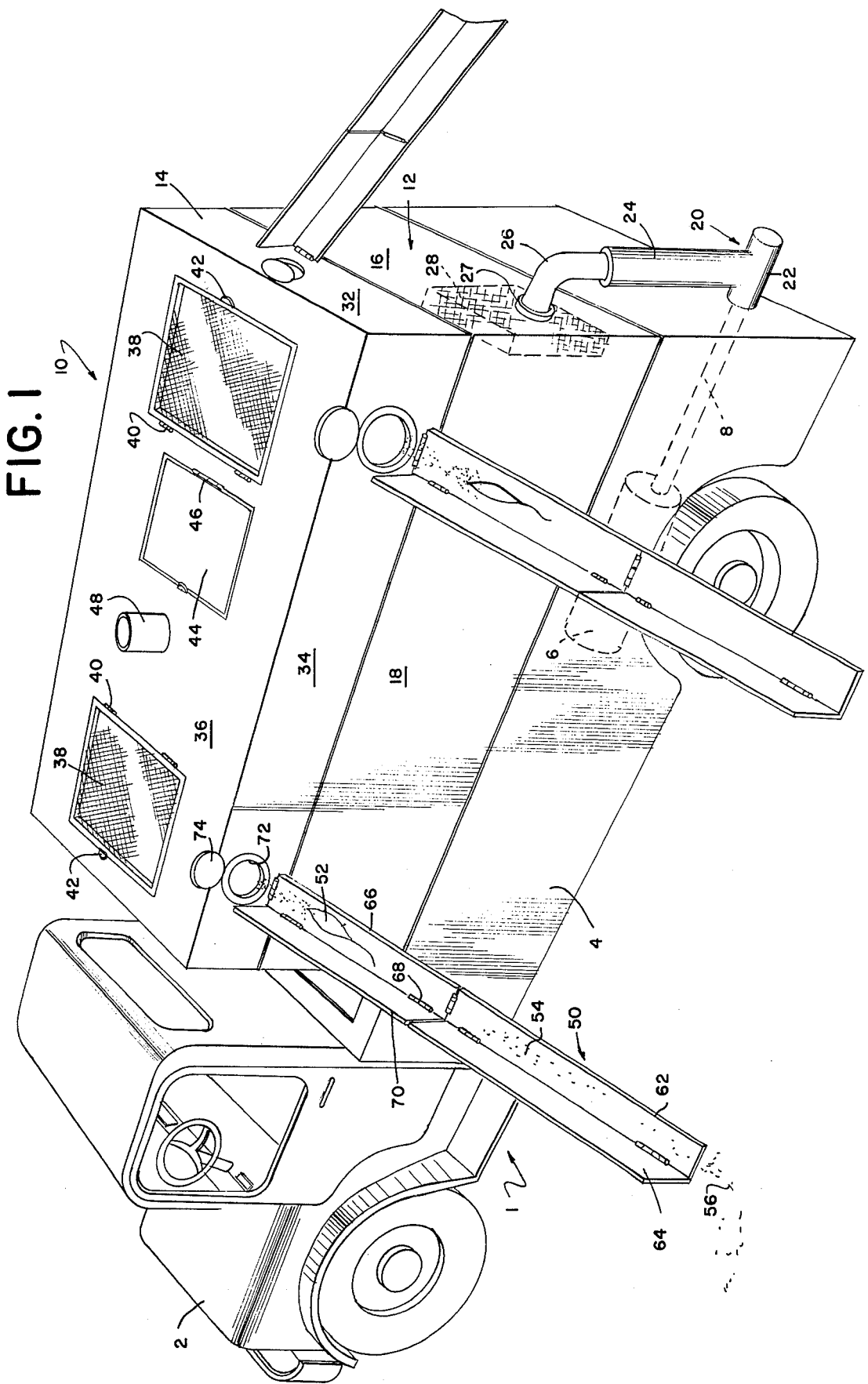
FIG. 1 is a representation of a truck-mounted embodiment of the present invention.

A truck-mounted rat trapping and exterminating system is generally denoted by the numeral 1 in FIG. 1. A truck 2 has a bed 4. A muffler 6 is connected to an engine, and the engine exhaust is passed through tail pipe 8. A container is generally indicated by the numeral 10. The container 10 has a lower portion 12 and an upper portion 14. Lower portion 12 has side walls 16 and 18. Side wall 18 is pivoted along its edge so that the entire side wall may be lifted to laterally dump the contents of container 10. Alternatively, side wall 16 is pivoted along its upper edge and is clamped in its downward position so that the side wall 16 may be pivoted as the bed 4 of truck 2 is lifted to dump container 10 in a conventional manner.

As shown in the drawing, a three-way valve 20 is connected to exhaust pipe 8. The valve has a straight portion 22 which passes exhaust gases directly to the atmosphere. An upper portion 24 of valve 20 is used to pass exhaust gases upward through hose 26 and hose connection 27 in rear side wall 16. A conventional deflector valve is used in the three-way valve 20. A screen 28 inside container 10 prevents hose coupling 27 from being blocked by rats or dead carcasses.

The upper portion 14 of the container 10 has side walls 32 and 34 and top wall 36. The top wall 36 is provided with windows 38 having frames mounted on hinges 40 for opening the windows and laying them back. The windows are closed by latches 42. Inside of the windows are screens which may be detached from the window accesses to provide access to the container.

A bait door 44 is connected to top 36 by a hinge 46. In a preferred embodiment, the centrally located bait door 44 has a hook on its inner side for holding bait suspended in the container. A closable vent 48 is provided in the top 36. The vent is sealed by a hinged door or by a conventional gate valve. An additional vent is provided in the front side wall of the lower portion 12. The additional vent has a screened enclosure similar to enclosure 28 and has a valve for closing the vent. Hose coupling 27 is provided in one embodiment with a check valve which permits inward flow of gases into the tank but which prevents flow of gases out of the tank. The vents 48 and the forward vents are provided with check valves which permit outward flow of gas upon excessive pressure within the container 10. In an alternate form of the invention, the hose coupling 27 is open. Adjusting the three-way valve 20 open channels 24 and 22 creates a negative pressure into 22 by virtue of the velocity of gases passing through pipe 22. In this manner, a negative pressure is produced in the container 10. Turning the valve member in 20 closes pipe 22 and flows exhaust into the container 10 with a greater immediate effectiveness.

As shown in the FIG. 1, ramps 50 are provided around the container 10 to lead rats 52 up to openings through which they are enticed into the container. The ramps are sprayed with a trail material 54, and the trails 56 are continued outward from the ramp along the ground to draw the rats onward toward the trap. Each ramp, in a preferred embodiment, has several horizontal sections 62 and 66 which are joined by a limited rotation hinge so that the ramps may be folded when the truck is underway. In a preferred embodiment, the ramp section 62 is provided with a wall 64, and ramp 66 is provided with a wall section 70 which are hinged to the ramp sections 62 and 66 by hinges 68 to permit folding.

A plurality of openings 72 is provided in the upper section 14 at several locations along the upper portion 14. Preferably 10 or more such openings, each accompanied by a ramp, are provided. Doors 74 are used to close openings 72 and seal them in airtight relationship before the container is moved. Preferably the openings 72 are more than 3 feet above the bottom of a container. Rats can jump 2 feet and can jump vertically 3 feet from a running start.

In a preferred use of the invention, the truck is driven into an alleyway or driveway in a central city location in which the signs of rat infestation may be noted. The ramps are lowered, and a trail 56 is sprayed along the ground and up the ramp. A suitable material for spraying the trail is grease which has been used to cook chicken such as in fast food operations. A bait which may be cooked meat or chicken parts is suspended from a hook on the inner side of door 44. Preferably the bait and the grease trail material are treated with a preservative to retard spoilage. Windows 38 may be laid open, and doors 72 are opened. The container 10 is left overnight in the alley or driveway. The following morning, a visual inspection is made through the windows 38 or through similar windows in the side walls. If rats are noticed in the container, doors 74 are closed, hinged ramps 50 are folded up over the truck and the truck is started, directing exhaust fumes through hose 26 into container 10. The exhaust fumes continue to flow through the container as the truck is driven to its destination. In an alternate embodiment, the valve 20 may be turned to shut off pipe 24 and to emit outward flow of exhaust through pipe 22, after container 10 has been filled with exhaust fumes while the truck is stationary.

Figures 2, 3:
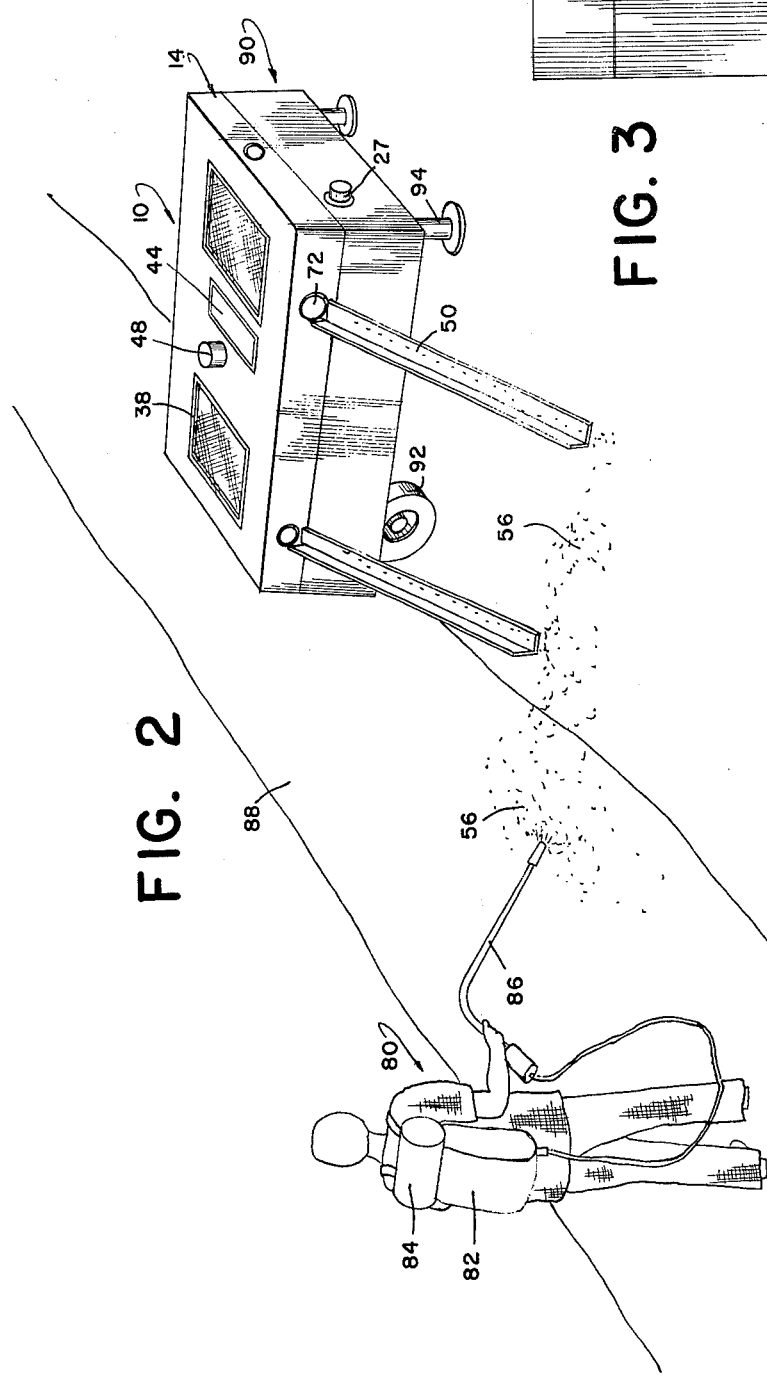
FIG. 2 is a view of a trailer-mounted embodiment of the present invention with a portable sprayer which is laying a trail.
FIG. 3 is a skid-mounted embodiment of the present invention which is usable with tilt-bed trucks.

In FIG. 2, container 10 is shown as configured for mounting on a trailer. A man 80 is depicted as laying a bait trail 56 from a supply 82. Pressurized fluid in tank 84 drives the bait material in tank 82 out through nozzle 86. As shown in the drawing, the trailer mounted configuration 90 has wheels 92 mounted on a bottom of the container and has liftable rest 94. A fifth wheel may be slid under the base to connect the trailer to a tractor. The foreshortened perspective is used to emphasize the detail of the system.

In FIG. 3, the container 96 is a large container which is configured with skids 98 for resting on the ground and for being hauled with a tilt-bed truck. Container 96 is fitted with a hose coupling 102 and with a permanently attached flexible hose 100 which has a distal end 104 for connection to an exhaust pipe of the haulage vehicle. The upper portion 14 is the same as the upper portions of the preceding embodiments.

One type of hose that is suitable is the flexible exhaust-coupling hose used by service garages when running vehicles. Neoprene hoses are satisfactory.

While the invention has been described with reference to specific embodiments, it will be obvious to those skilled in the art that modifications and variations of the invention may be made without departing from the scope of the invention. The scope of the invention is precisely defined in the following claims.

I claim:

1. Vermin trapping apparatus comprising a large container configured for mounting on a large haulage-type road vehicle, the container having side walls, a bottom wall connected to the side walls and having an upper portion with a top wall joined to the side walls in completion of the container, the support means connected to the bottom wall for supporting the container on a support vehicle, emptying means connected to the container for emptying contents of the container, plural openings in the upper portion of the container for providing ingress into the container, doors connected to the upper portion adjacent the plural openings for selectively closing the plural openings and ramp means connected to the upper portion adjacent the openings and extending downward and outward to ground level whereby rodents climb the ramp means and enter the container through the openings, and whereby the container may be hauled away and emptied by a roadway vehicle when rodents have been collected in the container.

2. The apparatus of claim 1 further comprising killing means connected to the container for killing rodents in the container.

3. The apparatus of claim 2 wherein the killing means comprises a hose coupling connected to a wall, a screened enclosure connected to the wall inside the coupling, and a vehicular exhaust pipe coupling means connected to the hose coupling for communicating the hose coupling with a vehicular exhaust pipe whereby lethal gases from a vehicular exhaust pipe passed through the hose coupling and screened enclosure into the container.

4. The apparatus of claim 3 wherein the coupling means comprises a three-way valve for connection to the exhaust pipe for alternatively supplying air to the hose coupling and container and to a direct exhaust.

5. The apparatus of claim 3 wherein the coupling means comprises a flexible coupling hose having a proximal end connected to the hose coupling and having a distal end configured for attaching to a vehicular exhaust pipe.

6. The apparatus of claim 3 further comprising a vent means connected to the upper portion at a position remote from the hose coupling for permitting flowing of gases from the hose coupling throughout the container and then out of the vent means.

7. The apparatus of claim 1 wherein the ramp means are hinged to the upper portion, and further comprising hinges connected to the ramp means for holding the ramp means on the container, and wherein the ramp means have lateral ramp walls.

8. The apparatus of claim 1 further comprising access means for providing visual and physical access to the container whereby rodents in the container may be observed, and bait may be placed within the container.

9. The apparatus of claim 1 further comprising vermin-enticing trail means extending along the ramp means and outward from bases of the ramp means on surrounding horizontal surfaces for attracting and leading rodents to the container.

10. The apparatus of claim 9 wherein the trail means comprises particles sprayed on the ramp and on the ground via a spray stream and wherein the apparatus further comprises a hand sprayer and body mounted back-pack type spray apparatus for directing the trail means around the container.

* * * * *